(12) United States Patent
Alsvig et al.

(10) Patent No.: US 9,430,144 B1
(45) Date of Patent: Aug. 30, 2016

(54) UNLOCKING ELECTRONIC DEVICES WITH TOUCHSCREEN INPUT GESTURES

(71) Applicant: International Business Machines Corporation, Armonk, NY (US)

(72) Inventors: John E. Alsvig, Tucson, AZ (US); Tao Jiang, Shanghai (CN); Jian Zhong Li, Shanghai (CN); Martin A. Tiernan, Tucson, AZ (US); Zhi Qiang Wei, Shanghai (CN); Xiao Qing Zhang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/749,702

(22) Filed: Jun. 25, 2015

(51) Int. Cl.
  *H04M 1/66* (2006.01)
  *G06F 3/0488* (2013.01)
  *G06F 21/36* (2013.01)

(52) U.S. Cl.
  CPC .......... *G06F 3/04883* (2013.01); *G06F 21/36* (2013.01)

(58) Field of Classification Search
  USPC ........................................................ 455/411
  See application file for complete search history.

(56) References Cited

U.S. PATENT DOCUMENTS

| | | | |
|---|---|---|---|
| 7,219,368 B2 | 5/2007 | Juels et al. | |
| 8,536,978 B2 | 9/2013 | Coggill | |
| 2002/0109677 A1 | 8/2002 | Taylor | |
| 2007/0192590 A1 | 8/2007 | Pomerantz et al. | |
| 2010/0186074 A1 | 7/2010 | Stavrou et al. | |
| 2011/0260829 A1 | 10/2011 | Lee | |
| 2012/0289200 A1 | 11/2012 | Yamashita et al. | |
| 2014/0143859 A1 | 5/2014 | Linge et al. | |

OTHER PUBLICATIONS

Accelerated Examination Support Document, U.S. Appl. No. 14/977,903 signed Dec. 21, 2015, 7 pgs.
Alsvig et al., "Unlocking Electronic Devices With Touchscreen Input Gestures," U.S. Appl. No. 14/977,903, filed Dec. 22, 2015.
List of IBM Patents or Patent Applications Treated as Related, Dec. 21, 2015, 2 pgs.

*Primary Examiner* — Joel Ajayi
(74) *Attorney, Agent, or Firm* — Bryan Bortnick; Nicholas D. Bowman (57) ABSTRACT

An electronic device can be unlocked by displaying, while the electronic device is in a locked state, on a touchscreen of the electronic device, line(s) dividing the touchscreen into input regions. Input gestures are detected on the touchscreen, and one of the input regions is identified as an input region containing the starting point of the input gesture. A base number is retrieved corresponding to the identified input region, and a numerical value of a password digit is calculated by using the base number and a numerical value corresponding to the input gesture. A sequence of thus calculated password digits is compared to a password stored within the electronic device, and the electronic device is unlocked following a match between the series of calculated password digits and the stored password.

16 Claims, 6 Drawing Sheets

UNLOCKING ELECTRONIC DEVICES WITH TOUCHSCREEN INPUT GESTURES

BACKGROUND

The present disclosure relates to unlocking an electronic device. In particular, this disclosure relates to detecting touchscreen input gestures from a device user and converting them to password characters used to unlock the electronic device.

A touchscreen may be an electronic visual display that a device user can control through simple or multi-touch gestures, by touching the screen with one or more fingers, a stylus or a pen. Some touchscreens may respond to finger touches and gestures, while others may be designed to respond to a special stylus or pen. The device user may use the touchscreen as an input device to interact directly with information displayed on the screen, and possibly to control how it is displayed. For example, selection choices from a menu displayed on the touchscreen may be received by the touchscreen, or the size of a displayed image, such as a map, may be altered through touchscreen input gestures.

Touchscreens may be found in a variety of applications where keyboard and mouse input devices may not allow a suitably intuitive, rapid, and/or accurate interaction by the user with the display's content. For example, touch screens may be common in devices such as smartphones, tablet computers, all-in-one computers, game consoles and automatic teller machines (ATMs). They can also be attached to computers or, as terminals, to networks. Touchscreens may play a prominent role in the design of digital appliances such as mobile phones, personal digital assistants (PDAs), satellite navigation devices, video games and e-books (electronic books).

A password may be a word or sequence of characters used to provide user authentication, to allow a user to gain access to an electronic resource or device. For example, a computer user may specify a password having a customizable number and sequence of characters that must be entered before access to the computer is allowed. A password may be a form of an electronic "key" that allows an authorized user to access an electronic device, while preventing unwanted or unauthorized users from accessing the device. A password may generally be short enough to be easily memorized and entered into an electronic device.

SUMMARY

Various aspects of the present disclosure may be useful for providing enhanced password security for an electronic device having a touchscreen. An electronic device configured according to embodiments of the present disclosure may, as a result of obfuscation of a password entered through one or more gestures on the electronic device's touchscreen, have a high level of security against unauthorized access.

Embodiments may be directed towards a computer implemented method. The computer implemented method may include displaying, on a touchscreen of an electronic device in a locked state, at least one line dividing the touchscreen into a plurality of input regions and identifying, from the plurality of input regions, an input region containing a starting point of an input gesture detected on the touchscreen. The computer implemented method may also include calculating, using a retrieved base number corresponding to the input region and a numerical value corresponding to the input gesture, a password digit. The computer implemented method may also include comparing a sequence of calculated password digits to a password stored in the electronic device, wherein the sequence of calculated password digits includes the password digit, and unlocking the electronic device.

Embodiments may also be directed towards an electronic device comprising a touchscreen display and one or more processor circuits. The processor circuits may be configured to display, on a touchscreen of an electronic device in a locked state, at least one line dividing the touchscreen into a plurality of input regions. The processor circuits may be also configured to identify, from the plurality of input regions, an input region containing a starting point of an input gesture detected on the touchscreen and calculate, using a retrieved base number corresponding to the input region and a numerical value corresponding to the input gesture, a password digit. The processor circuits may be also configured to compare a sequence of calculated password digits to a password stored in the electronic device, wherein the sequence of calculated password digits includes the password digit, and to unlock the electronic device.

Embodiments may also be directed towards a computer program product for unlocking an electronic device. The computer program product may include at least one computer readable storage medium having program instructions embodied on it. The at least one computer readable storage medium is not a transitory signal per se. The program instructions can be executable by at least one computer processor circuit to cause the at least one computer processor circuit to perform a method. The method may include displaying, on a touchscreen of an electronic device in a locked state, at least one line dividing the touchscreen into a plurality of input regions. The method may also include identifying, from the plurality of input regions, an input region containing a starting point of an input gesture detected on the touchscreen and calculating, using a retrieved base number corresponding to the input region and a numerical value corresponding to the input gesture, a password digit. The method may also include comparing a sequence of calculated password digits to a password stored in the electronic device, wherein the sequence of calculated password digits includes the password digit, and unlocking the electronic device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing enhanced password security for mobile digital devices with touchscreens such as smartphones, personal digital assistants (PDAs), satellite navigation devices (GPS units) and electronic books. Such mobile digital devices may contain sensitive and valuable user data such as personal identity and financial information. While not necessarily limited thereto, embodiments discussed in this context can facilitate an understanding of various aspects of the disclosure. Certain embodiments may also be directed towards other equipment and associated applications, such as providing enhanced password security for computers, which may be used in a wide variety of personal and commercial applications. Such computers may include, but are not limited to tablet, touchscreen or all-in-one computers. Embodiments may also be directed towards providing enhanced password security for publicly available electronic devices such as automated teller machines (ATMs), kiosk computers and permanently installed security and automation systems.

For ease of discussion and illustration, the term "smartphone" is used herein; however, it is understood that various embodiments can also be useful with regards to other electronic devices and systems such as tablet computers, PDAs, ATMs, publicly accessible computer kiosks, or other electronic devices or systems where password obfuscation may be desirable.

Various embodiments of the present disclosure relate to a method of entering passwords into a touchscreen electronic device, which may conceal the entered password from individuals who may observe the electronic device during password entry. The password entry method may therefore be useful for providing enhanced security of electronic devices which may be accessed in view of individuals unauthorized to use the device. Enhanced electronic data security may result from the use of the described password entry method(s). The password entry method(s) may also be useful in providing authorized persons with the ability to rapidly access touchscreen electronic devices and systems through touchscreen input gestures which may be easily memorized, and which may be difficult for an unauthorized user to recognize and replicate. Password entry method(s) according to embodiments may have certain cost advantages over certain authentication methods such as biometric identification.

Aspects of the various embodiments may be used to conceal a password, entered by the user of an electronic device, from unauthorized users who may observe the password being entered. Aspects of the various embodiments may also be useful for providing a cost-effective password security enhancement for use with a wide variety of touchscreen electronic devices, by using existing and proven software and electronic hardware technologies and design practices.

A password entry method implemented according to certain embodiments may be compatible with existing and proven touchscreen electronic devices, and may be a useful and cost-effective way to protect sensitive and valuable data. A password entry method constructed according to embodiments of the present disclosure may be implemented on a variety of existing electronic devices and systems.

Portable electronic devices such as smartphones and PDAs have become very popular and widely adopted as a result of an extensive range of capabilities and benefits they can offer users. Capabilities such as convenient, mobile access to the Internet for web browsing, sending and receiving email, instant messaging, texting, video communication, and a wide range of available applications have incented many portable device owners to use their smartphone or other portable electronic device for tasks and functions formerly only performed on a "non-portable" computer such as a desktop personal computer (PC). Online banking, shopping, stock trading, small business management, and many types of personal and commercial communication are now performed reliably and regularly using portable devices such as smartphones.

The growing popularity of mobile devices has precipitated an increase in the amount of private and sensitive data that is stored on, and transferred through, devices such as smartphones. Vulnerable data may include identity-related items such as names, phone numbers, addresses and Social Security numbers, and financial data such as bank account and credit card numbers. While having these types of sensitive data on a small, conveniently mobile device is advantageous to many users, it also presents significant security risks. A compromised smartphone password, for example, may result in identity theft, or many types of fraudulent, criminal activities, resulting from data accessed or retrieved from a smartphone by an unauthorized user.

A smartphone password may be entered by simply typing numbers onto a keypad displayed on a touchscreen, or by using keys on a keypad. While these methods of password entry may be effective, they may also be easily observed by a nearby individual that is not authorized to use the smartphone, who may recognize the entered password, and may take advantage of it at a later time.

Similarly, a password may be entered through an input gesture having a certain geometric pattern or shape. These methods, however, may also be observed and recognized, which may allow the recognized pattern to be used to gain unauthorized access to a smartphone or other mobile device.

Certain embodiments of the present disclosure relate to a method for unlocking a touchscreen electronic device by the device receiving touchscreen input gestures that may be concealed from an unauthorized user, and converting them to password digits to unlock the device.

For ease of discussion, the term "password" is used herein, in reference to a sequence of characters used to authenticate a user of an electronic device, and subsequently unlock or lock the electronic device. It is understood, however, that various embodiments can also be useful with regards to other codes used to lock and unlock an electronic device such as personal identification numbers (PINs). The terms "password" and "PIN" may thus be used interchangeably herein.

Embodiments of the present disclosure may be useful in allowing the user of an electronic device to lock and/or unlock the device by using input gestures on a touchscreen of the device. The input gestures can each correspond to a single-digit number, and can be entered in a way that allows them to be easily concealed from other individuals which may view the entry of the gestures. Embodiments can provide for a high level of password and data security for touchscreen-enabled electronic devices such as smartphones, ATMs and tablet computers.

Figure 1:
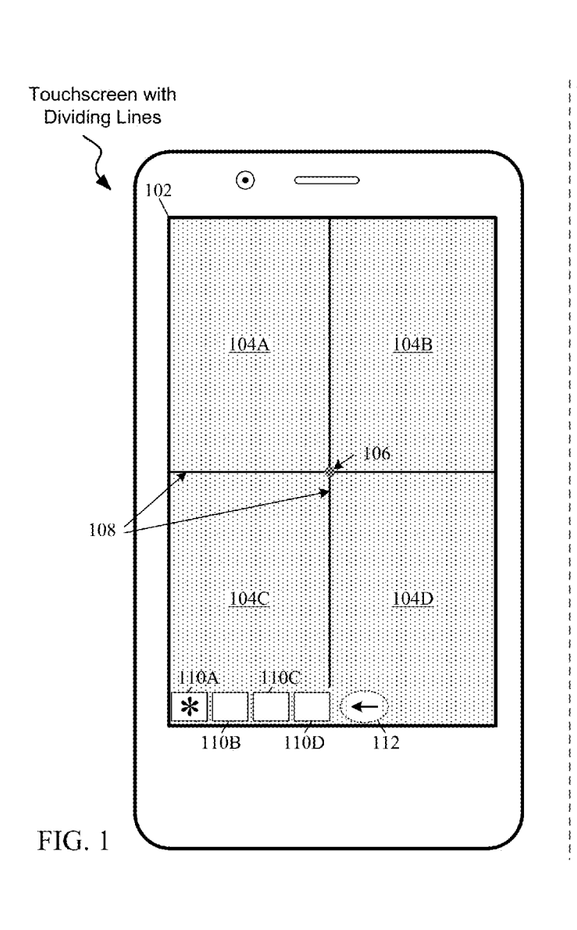
FIG. 1 depicts a touchscreen with displayed lines that divide the touchscreen into a plurality of input regions, according to embodiments of the present disclosure.

Certain embodiments relate to unlocking an electronic device in response to detected touchscreen input gestures. FIG. 1 depicts a touchscreen 102 of an electronic device such as a smartphone or PDA with displayed dividing lines 108 that divide the touchscreen 102 into a plurality of input regions 104A-104D, according to embodiments of the present disclosure. Touchscreen 102 may be generally useful for displaying data from and receiving user input to an electronic device such as a smartphone or tablet computer. Lines 108 may be useful in defining input regions, e.g., 104A-104D, in which a user may start one or more input gestures. Dividing lines 108 can be displayed, in embodiments, in response to the determination that the electronic device is in a locked state. In some embodiments, the plurality of input regions of the touchscreen 102 can be quadrants, as depicted, and in some embodiments, a different number of input regions, for example, two, six or eight, may be defined by dividing lines 108.

Lines 108 can have a variety of shapes, colors, widths, orientations and positions, which may be useful in concealing a password digit, represented by a touchscreen input gesture, according to embodiments. Differentiation of lines from other lines through variation of colors, thicknesses or other characteristics may enable an electronic device user to easily memorize touchscreen input gestures used for password entry into the device. The characteristics of dividing lines 108 may be varied to make lines 108 visible to a user, positioned near the electronic device, while restricting stability of the lines to other, nearby individuals. In embodiments, center dot 106 can be positioned at the intersection of two or more lines 108, may be colored differently than the two or more lines 108, and may indicate a location useful for entering a "0" digit with an input gesture.

A user of the electronic device can, through touchscreen input gestures, enter numeric digits of a password or PIN used to unlock the electronic device, according to embodiments of the present disclosure. Touch screen 102 input gestures and associated password digits, entered into the electronic device, may be concealed from individuals other than an authorized user, according to embodiments. A touchscreen input gesture may be converted into a password digit in response to a numeric value corresponding to the input gesture and a calculated offset of the numeric value based upon the input region, e.g., 104A-104D, that contains a starting point of the input gesture.

Touchscreen 102 is depicted displaying password cubicles 110A-110D, which may be useful to provide user feedback indicating one or more received or entered password characters, in response to touchscreen input gestures. For example, the electronic device may signal to the user that it has received a password character, by displaying a symbol or character, e.g.; an asterisk, in a formerly empty password cubicle. FIG. 1 depicts four password cubicles 110A-110D; however, other numbers of password cubicles may be possible. Back arrow 112 may be useful following the entry of an incorrect password digit; in embodiments, the electronic device can delete one or more password digits in response to a user tapping the back arrow 112 icon. Once an entire password or PIN that matches a predefined password stored within the electronic device has been correctly entered, the electronic device can be unlocked and made available for user interaction.

Figure 2:
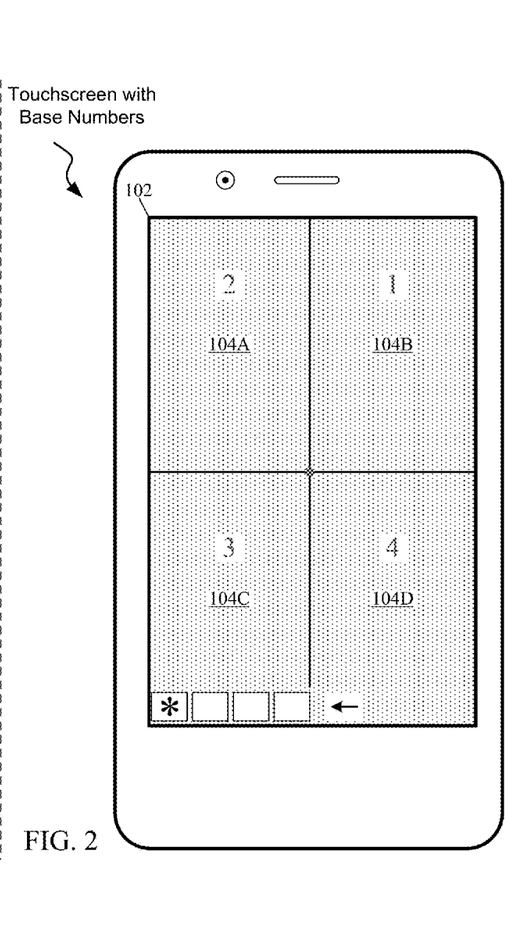
FIG. 2 depicts a touchscreen having a plurality of input regions and base numbers corresponding to the plurality of input regions, according to embodiments.

FIG. 2 depicts the touchscreen 102 having base numbers 1-4 corresponding to a plurality of input regions 104A-104D, according to embodiments consistent with the figures. According to embodiments, the base numbers may be useful in offsetting, and thus obfuscating, the calculated value of a password digit entered through an input gesture. In embodiments, the base numbers, e.g., "1", "2", "3" and "4", or other values, can be assigned by the user of an electronic device to the input regions, e.g., 104B, 104A, 104C and 104D, respectively. The base numbers depicted in FIG. 2 are included only for the purposes of illustration; in embodiments, they are not displayed on the touchscreen of the electronic device.

A touchscreen input gesture may include a simple line, a curve, or a simple or complex shape, including the shape of a single-digit numeral, each of which may be traced while a user continuously contacts the touchscreen with a finger, stylus, or pen. Once continuous contact with the touchscreen ceases, for a predetermined period of time, then the electronic device may detect further contact with the touchscreen as a second touchscreen input gesture. In some embodiments, the predetermined period of time between touchscreen gestures may be set through user interaction with program instructions executable by the electronic device.

FIG. 3-FIG. 6 depict four examples of the entry of touchscreen gestures 360, 460, 560 and 660, respectively, that resemble a numeral "6", on a touchscreen 102, according to embodiments. FIG. 3-FIG. 6 may be useful for illustrating how varying a gesture starting point location may be useful in concealing the calculated value of a password from a person observing the input gesture. According to embodiments, a number of consistent input gestures, e.g., 360, 460, 560 and 660, when entered into a variety of input regions, e.g., 104A-104D, can result in a number of unique calculated password digit values. A series of calculated password digit values that result from input gestures and that match a stored password value may be used to unlock the electronic device.

Figure 3:
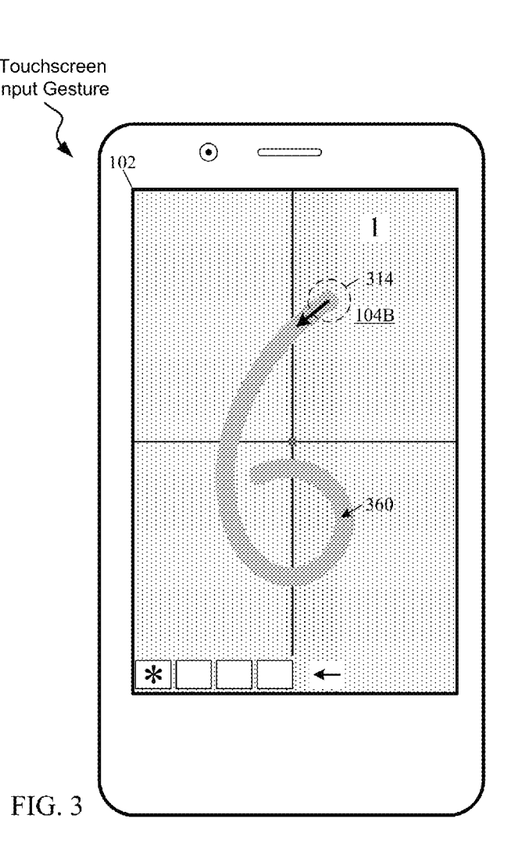
FIG. 3 depicts a touchscreen input gesture and gesture starting point in an input region, according to embodiments.

Turning now to FIG. 3, touchscreen 102 is depicted receiving an input gesture 360 that has a gesture starting point 314 located in input region 104B, according to embodiments consistent with the figures. According to embodiments, the electronic device can respond by detecting the input gesture and identifying the location of the gesture starting point 314 within the input region 104B of the touchscreen 102. In embodiments, an input gesture can include multiple gesture motions in multiple directions on the touchscreen 102. After identifying the input region 104B that contains the gesture starting point 314, the electronic device retrieves a base number corresponding to the input region. In this example, the base number "1", as depicted in FIG. 3, is retrieved.

Once the base number is retrieved, the electronic device can calculate a password digit based on the base number, e.g., "1", and a numerical value corresponding to the input gesture, e.g., "6". In some embodiments, an addition operation can be used to calculate a password digit, and in some embodiments a subtraction operation can be used to calculate the password digit. For example, using an addition operation, the password digit is calculated as:

$$6+1=7,$$

and using a subtraction operation, the password digit is calculated as:

$$6-1=5.$$

Thus, two unique calculated password digits may be calculated based upon which mathematical operation is used for the calculation. According to embodiments, the operation, e.g., addition or subtraction, may be selected or set by the electronic device user. In some embodiments, a "0" password digit may be "calculated", i.e., entered into the electronic device, in response to a delay that is greater than a predetermined delay between two consecutive input gestures. In some embodiments, a "0" password digit may be "calculated", i.e., entered into the electronic device, in response to an input gesture passing over a particular area of the touchscreen. In some embodiments, the area may be highlighted by a visual indicator displayed on the touchscreen.

Figure 4:
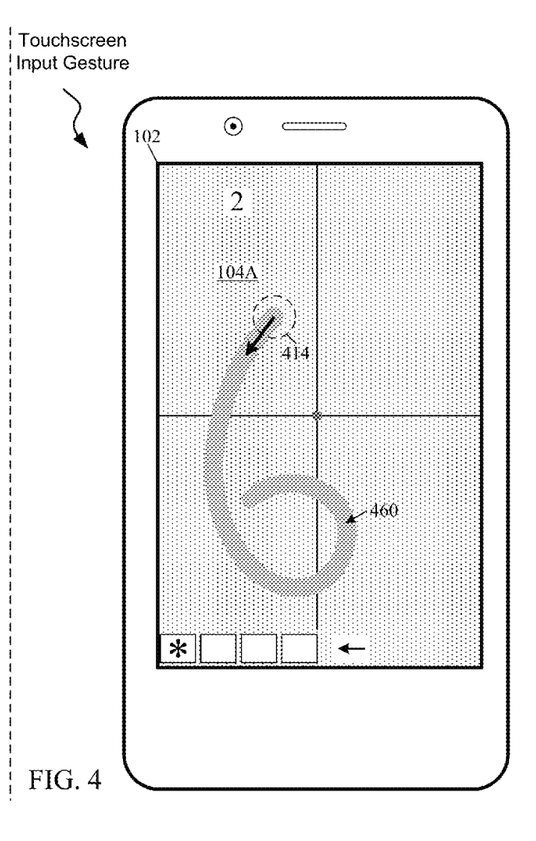
FIG. 4 depicts a touchscreen input gesture and gesture starting point in an input region, according to embodiments.

Similarly, FIG. 4 depicts touchscreen 102 receiving an input gesture 460 that has a gesture starting point 414 located in input region 104A, according to embodiments consistent with the figures. After identifying the input region 104A that contains the gesture starting point 414, the electronic device retrieves a base number "2", as depicted in FIG. 4, corresponding to the input region. The electronic device can then calculate a password digit based on the base number "2", and a numerical value corresponding to the input gesture, e.g., "6". In this example, using an addition operation, the password digit is calculated as:

$$6+2=8,$$

and using a subtraction operation, the password digit is calculated as:

$$6-2=4.$$

Figure 5:
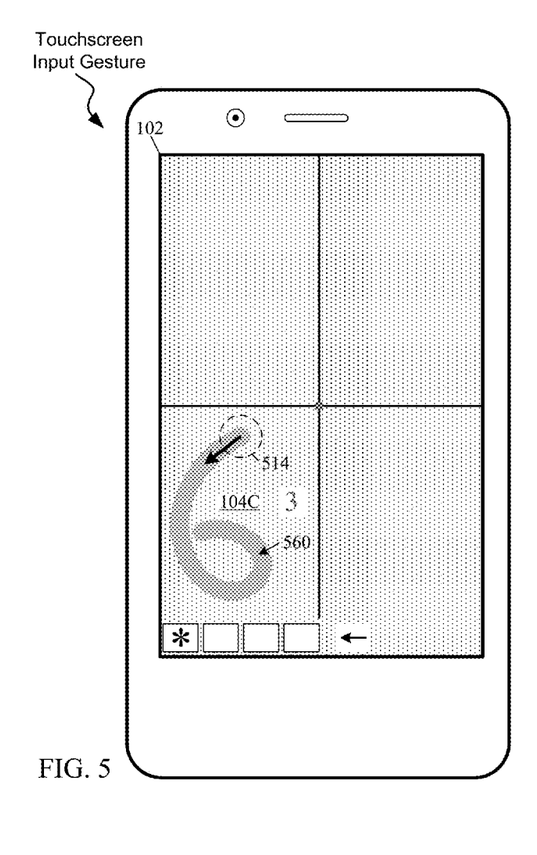
FIG. 5 depicts a touchscreen input gesture and gesture starting point in an input region, according to embodiments.

Similarly, FIG. 5 depicts touchscreen 102 receiving an input gesture 560 that has a gesture starting point 514 located in input region 104C, according to embodiments consistent with the figures. After identifying the input region 104C that contains the gesture starting point 514, the electronic device retrieves a base number "3", as depicted in FIG. 5, corresponding to the input region. The electronic device can then calculate a password digit based on the base number "3", and a numerical value corresponding to the input gesture, e.g., "6". In this example, using an addition operation, the password digit is calculated as:

$$6+3=9,$$

and using a subtraction operation, the password digit is calculated as:

$$6-3=3.$$

Figure 6:
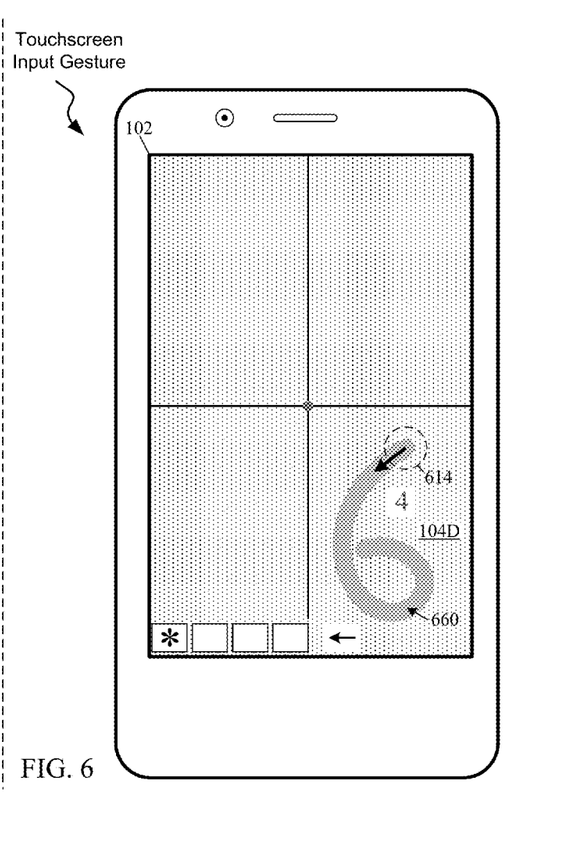
FIG. 6 depicts a touchscreen input gesture and gesture starting point in an input region, according to embodiments.

Similarly, FIG. 6 depicts touchscreen 102 receiving an input gesture 660 that has a gesture starting point 614 located in input region 140D, according to embodiments consistent with the figures. After identifying the input region 140D that contains the gesture starting point 614, the electronic device retrieves a base number "4", as depicted in FIG. 6, corresponding to the input region. The electronic device can then calculate a password digit based on the base number "4", and a numerical value corresponding to the input gesture, e.g., "6". In this example, using an addition operation, the password digit is calculated as:

$$6+4=10,$$

and using a subtraction operation, the password digit is calculated as:

$$6-4=2.$$

In this example, the electronic device may select the least significant digit of the addition result, i.e., "0", as the calculated password digit. In some embodiments, the electronic device may select the most significant digit of a calculation result, may default to zero or some other number, or may employ a different predetermined approach for handling multiple-digit calculated values.

FIG. 3-FIG. 6 depict how aspects of various embodiments such as a variety of input regions, associated base numbers and a variety of calculation types can be used in combination to provide for a number of unique calculated password digits to be entered using similar/consistent input gestures. According to embodiments, these unique calculated password digits may be useful in providing enhanced password security, during input gesture entry, for an electronic device having a touchscreen.

In some embodiments consistent with FIG. 6, the calculating of a password digit can include setting the password digit to a least significant digit of a calculation result that includes more than one digit. In some embodiments, the calculating of a password digit can include setting the password digit to the absolute value of a calculation result that is less than zero. For example, if the password digit calculation is:

$$2-6=-4,$$

then the digit can be set to "4" rather than "−4". According to embodiments, other touchscreen gestures representing and having a numeric value of a single digit integer, for example, the digits "0" through "9," may be used as input gestures.

Figure 7:
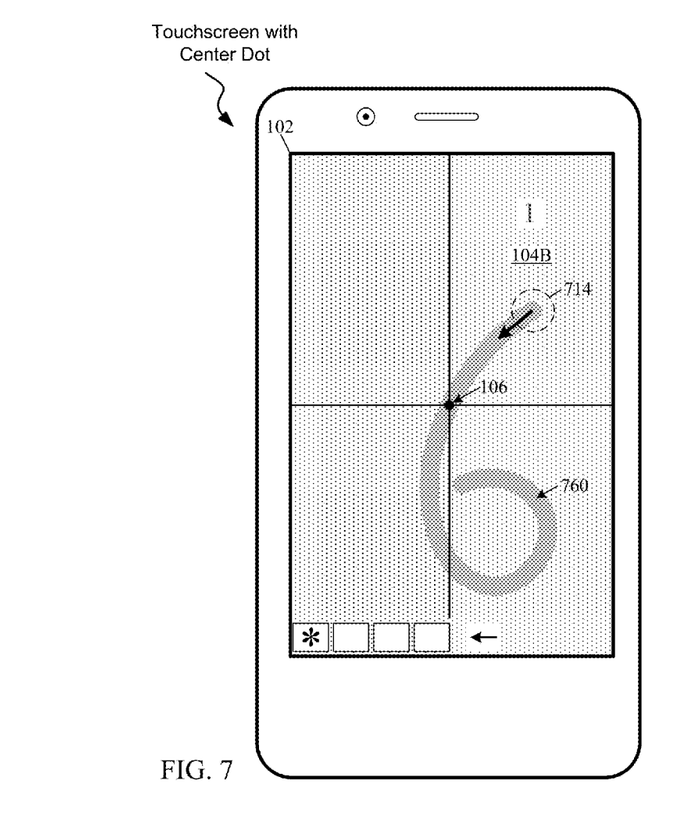
FIG. 7 depicts a touchscreen input gesture passing through a center dot, according to embodiments.

FIG. 7 depicts a touchscreen input gesture 760 passing through a center dot 106, according to embodiments consistent with the figures. In embodiments, the center dot 106 can be displayed at an intersection of at least two lines displayed on the touchscreen. According to embodiments, the electronic device can detect input gesture 760 passing over, or within a specified proximity of, the center dot 106, and can, in response, calculate, i.e., enter, a "0" password digit. Using the center dot 106 for entering a "0" password digit may be useful in obfuscating the entry of a "0", while a user enters an input gesture that would otherwise correspond to a numeric value other than "0".

According to certain embodiments, a "0" password digit may also be calculated in response to a delay that is greater than a predetermined delay between two gestures. For example, in embodiments, a delay between gestures of more than two seconds may result in a "0" password digit being calculated.

Figure 8:
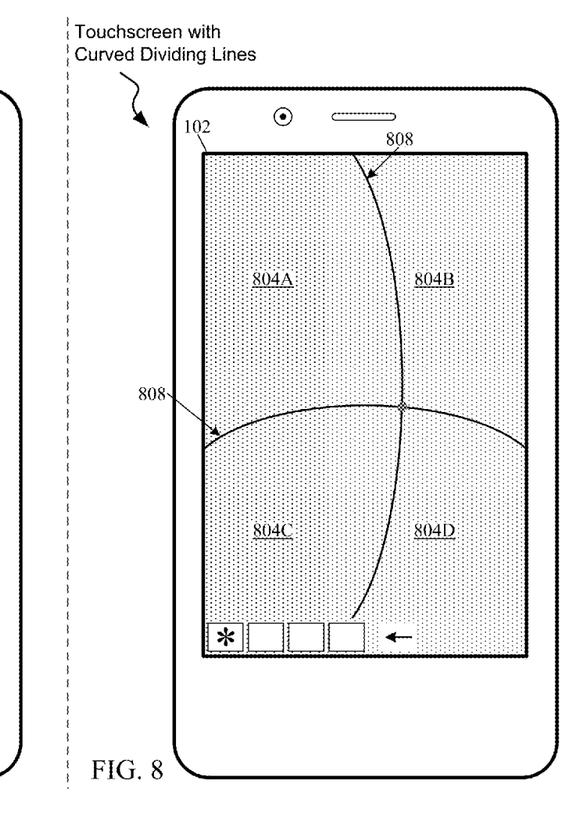
FIG. 8 depicts a touchscreen having curved dividing lines, according to embodiments.

FIG. 8 depicts a touchscreen 102 having curved dividing lines 808, according to embodiments consistent with the figures. In embodiments, a variety of different types of dividing lines, e.g., 808, such as straight, curved, regular and irregular lines may be displayed on touchscreen 102, and may be used to divide touchscreen 102 into a number of input regions, e.g., 804A-804D. A variety of different types of dividing lines may be useful in obfuscating the location of input regions to individuals other than the electronic device user, and thus may be used to increase password security of the electronic device.

In some embodiments, a user may modify at least one characteristic of the dividing lines 808 including the number, shape, color, width, orientation and position of the lines. In some embodiments, the electronic device may be configured to change at least one dividing line characteristic at a regular time interval, which a user may specify, at a random time interval, or in response to the electronic device entering the locked state.

Figure 9:
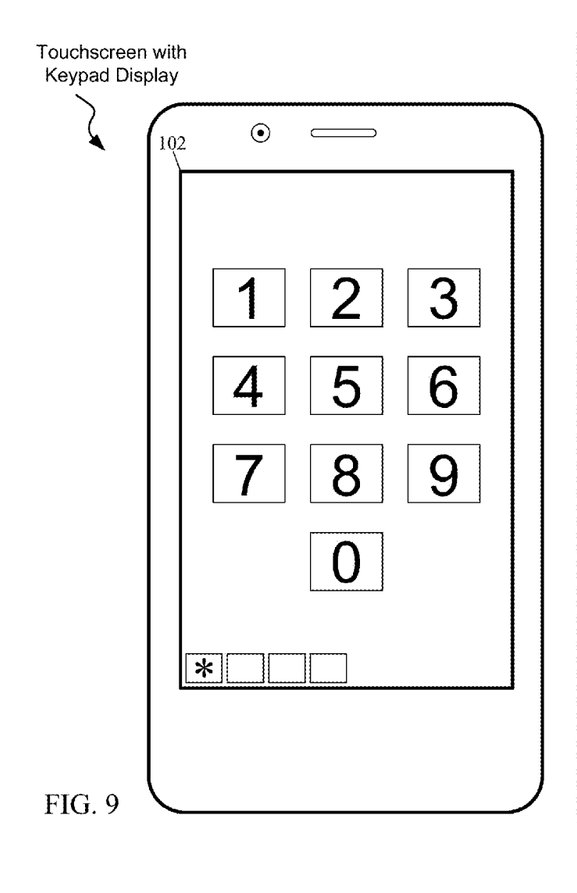
FIG. 9 depicts a touchscreen displaying a numeric keypad input area, according to embodiments.

FIG. 9 depicts a touchscreen 102 displaying a numeric keypad input area, according to embodiments consistent with the figures. The touchscreen display 102 may be configured to detect a sequence of input gestures positionally related to numeric keys displayed on the touchscreen, and one or more processor circuits within the electronic device may be configured to convert the input gestures to password digits. The display of a numeric keypad area, and receiving of password digits corresponding to the displayed keypad may be useful for entering password digits as an alternative to touchscreen input gestures, in certain circumstances. For example, if a user enters a predetermined number, e.g. three, of incorrect password digits using input gestures, program instructions within the electronic device may replace the touchscreen lines display with a numeric keypad display to enable the user to enter a password, according to embodiments. In another example, the display may include a selectable icon that allows a user to switch between using input gestures and the numeric keypad.

Figure 10:
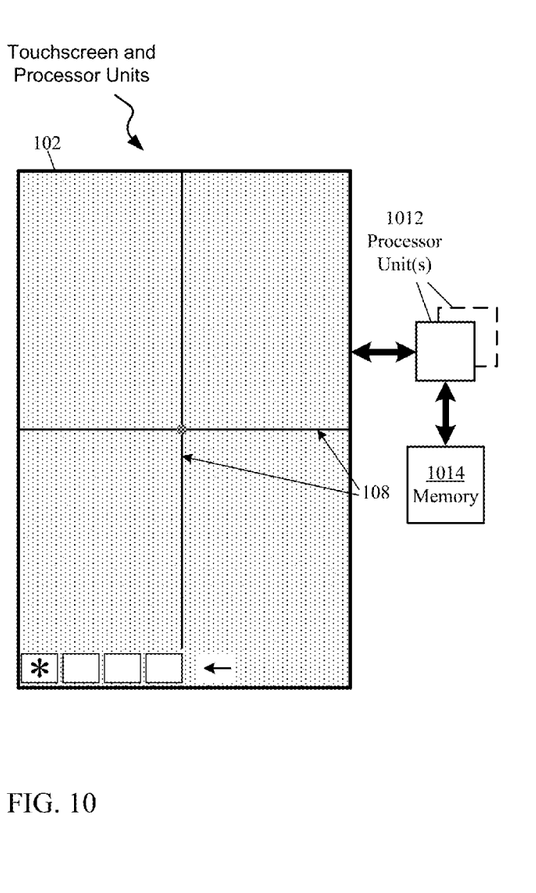
FIG. 10 depicts a touchscreen display and processor units, according to embodiments.

FIG. 10 depicts a touchscreen display 102 of an electronic device with dividing lines 108, processor unit(s) 1012, and memory 1014, according to embodiments consistent with the figures. The touchscreen 102 may be in communication with the processor unit(s) 1012, and may be useful in receiving information to display from the processor unit(s) 1012, and may send touchscreen 102 input information resulting from touchscreen input gestures to the processor unit(s) 1012.

Touchscreen display 102 may include a controller and software/firmware configured to detect a touchscreen input gesture, including a location of an origin point of the gesture, and send information regarding the touchscreen input gesture to processor unit(s) 1012. The controller and software/firmware may also be configured to display information received from processor unit(s) 1012, such as text, images and graphics.

Processor unit(s) 1012 may be a microprocessor, e.g.; an Advanced RISC Machines (ARM) processor, or other device consistent with processors used in smart phones or other mobile devices, and may be configured to execute computer readable program instructions stored in a memory unit 1014. Memory unit 1014 may be a nonvolatile memory chip or module (a computer readable storage medium), suitable for holding program instructions and data used by processor unit(s) 1012.

Program instructions stored in a memory unit 1014 may include a computer program product configured to execute a method for unlocking an electronic device in response to detected input gestures, according to embodiments. The method for unlocking the electronic device may include displaying dividing lines on the touchscreen, detecting an input gesture, identifying and input region corresponding to an input gesture starting point, calculating a password digit and unlocking the electronic device, consistent with operations described herein, and particularly with reference to FIG. 11.

Processor unit(s) 1012 may be configured to change at least one dividing line characteristic such as the number, shape, color, width, orientation, position and spacing of the dividing lines displayed on the touchscreen display. Processor unit(s) 1012 may be configured to change at least one dividing line characteristic at a regular time interval, which a user may specify, at a random time interval, or in response to the electronic device entering the locked state.

Figure 11:
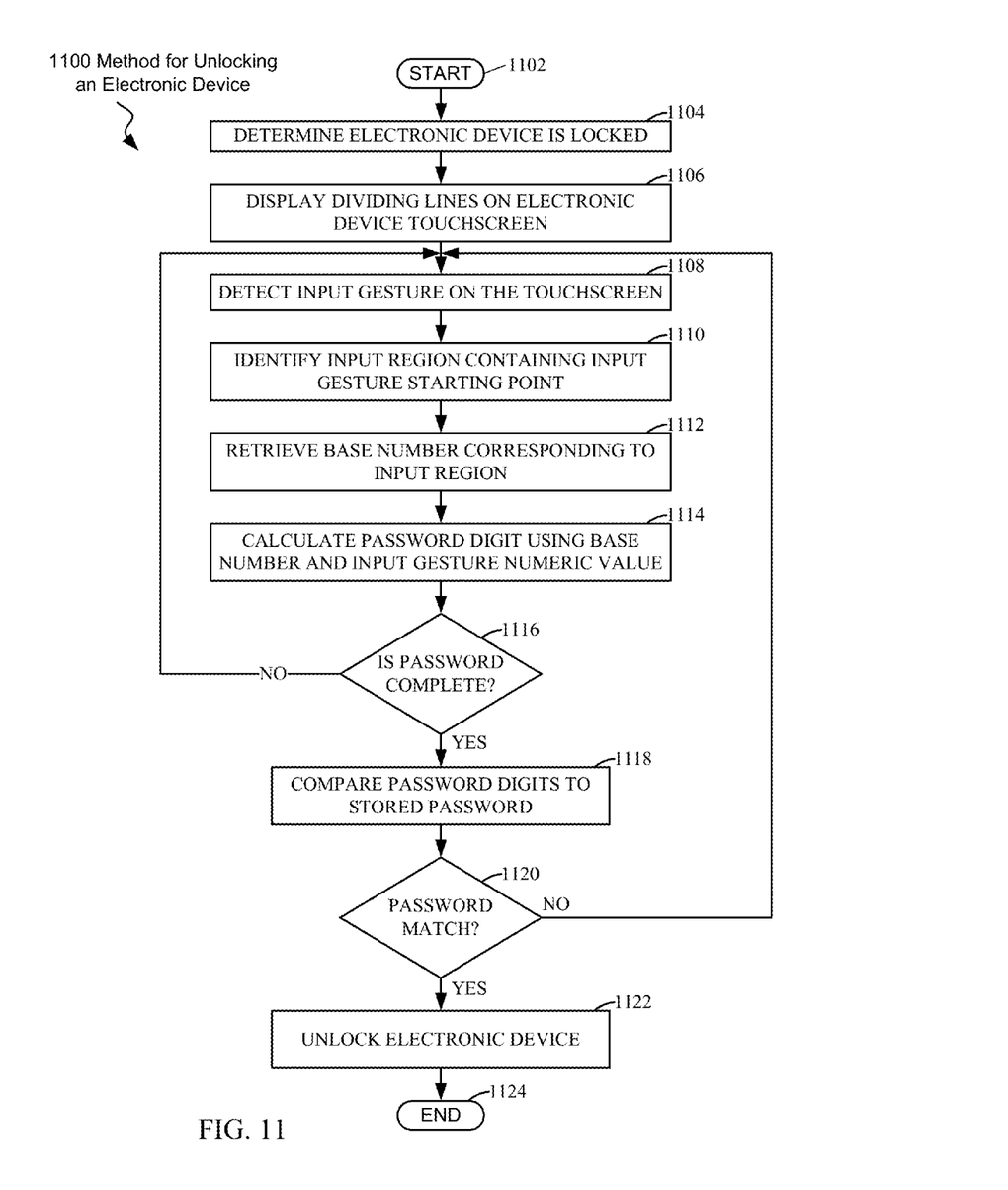
FIG. 11 is a flow diagram illustrating a method for unlocking an electronic device in response to detected touchscreen input gestures, according to embodiments.

FIG. 11 is a flow diagram, consistent with the figures, which illustrates a method of unlocking an electronic device in response to detected touchscreen input gestures, according to embodiments. The process 1100 moves from start 1102 to operation 1104. Operation 1104 generally refers to determining if the electronic device is in a locked state. The electronic device may be rendered locked, i.e., unusable by a user, by a lock command or operation issued by a user, or by a timed lock operation performed by the electronic device following a predetermined period of inactivity. Once the electronic device is determined to be locked, the process moves to operation 1106.

Operation 1106 generally refers to displaying at least one dividing line on the touchscreen of the electronic device in response to the electronic device being determined to be in a locked state, as determined by operation 1104. Dividing lines may be useful for dividing the touchscreen into a number of input regions, in which a user may start an input gesture. Consistent with the figures and their associated descriptions, the lines may be displayed having a variety of characteristics including shapes, colors, widths, orientations and positions. Line characteristics may be customized by a user or changed by the electronic device at regular or irregular time intervals, and/or when the electronic device is placed in a locked state. The variety of line characteristics which may be displayed, in conjunction with changes to the characteristics, may be useful in obfuscating a calculated value of a password digit associated with a touchscreen input gesture. Once at least one dividing line is displayed on the touchscreen, the process moves to operation 1108.

Operation 1108 generally refers to detecting an input gesture on the touchscreen. An input gesture may be detected when a user's finger or stylus makes contact with and moves on the surface of the touchscreen. An input gesture may be determined, by the electronic device, to be completed after a predetermined time interval elapses following the last gesture motion on the touchscreen or from the last detected contact of a finger or stylus with the touchscreen. For example, a time period of 1 second may be used as the predetermined time interval. The predetermined time interval may be customizable by a user.

An input gesture may be detected regardless of the direction of the gesture. Input gesture shapes may include straight, curved, circular, or may include the outline of numeral, letter, or other shape. In embodiments, a variety of input gesture shapes can be used to produce a detectable input gesture, which can be useful in obfuscating the calculated value of a password digit corresponding to a particular input gesture. Once the input gesture has been detected, the process moves to operation 1110.

Operation 1110 generally refers to identifying, in response to detecting an input gesture, an input region that contains the starting point of the input gesture detected in operation 1108. A number of input regions may be useful in allowing a user to assign a number of different password digit values to a particular input gesture by starting the gesture in the various input regions. Once the input region is identified, the process moves to operation 1112.

Operation 1112 generally refers to retrieving a base number corresponding to the input region identified in operation 1110. In embodiments, a base number can be used as an offset from an input gesture value when calculating a password digit value. Each input region can be assigned a unique corresponding base number by a user of the electronic device. In some embodiments, the base numbers may be stored on the electronic device, and in some embodiments the base numbers may be stored remotely, for example, on a server. Once the base number is retrieved, the process moves to operation 1114.

Operation 1114 generally refers to calculating a password digit based upon an input gesture value and a base number corresponding to an input region containing a starting point of the input gesture. For example, an input gesture in the shape of the numeral "6" may have an input gesture value of six, and the starting point of the input gesture may correspond to an input region having a base value of two. In some embodiments, an addition operation is used by the electronic device to calculate a resulting password digit as: 6+2=8. Following the same example, in some embodiments, a subtraction operation is used by the electronic device to calculate a resulting password digit as: 6−2=4.

Using a different example, an input gesture may have a gesture value of 8 and the base value assigned to the input region may have a value of 4. In a particular embodiment, an addition operation can be used by the electronic device to calculate: 8+4=12, and subsequently set the password digit to the least a significant digit of the calculation, i.e., "2".

In another example, an input gesture may have a gesture value of 3 and the base value assigned to the input region may have a value of 8. In a particular embodiment, a subtraction operation can be used by the electronic device to calculate: 3−8=−5, and subsequently set the password digit to the absolute value of the calculation, i.e., "5". After the value of the password digit been calculated, the process moves to operation 1116.

At operation 1116, the total number of password digits generated by operation 1114 is compared against the number of digits in a password stored within the electronic device. If the total number of password digits generated by operation 1114 is equal to the number of digits in a password stored within the electronic device, the process moves to block 1118. The process may also move to block 1118 in response to an "enter" or "confirm" touchscreen input gesture, possibly positionally related to an "enter" key being displayed on the touchscreen, being received as an indicator from the user that the password entry is complete. If the total number of password digits generated by operation 1114 is not equal to the number of digits in a password stored within the electronic device, the process returns to operation 1108.

Operation 1118 generally refers to comparing a sequence of password digits entered through touchscreen input gestures and converted by operation 1114 to a stored password in the electronic device. After the sequence of password digits is compared to the stored password, the process moves to decision 1120.

At decision 1120, if the entered sequence of calculated password digits matches the password stored within the electronic device, the process moves to block 1122. If the entered sequence of password digits does not match the password stored within the electronic device, the process returns to operation 1108.

Operation 1122 generally refers to unlocking the electronic device in response to a matching of the sequence of calculated password digits to the stored password of decision 1120. The electronic device may be placed in a usable state, which may allow the user to access resources within the device, such as sensitive data, applications and operating system functions. After the electronic device is unlocked, the process 1100 may end at block 1124.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
    displaying, on a touchscreen of an electronic device in a locked state, at least one line dividing the touchscreen into a plurality of input regions;
    receiving, on the touchscreen of the electronic device, a plurality of input gestures, each input gesture being a representation of a corresponding value;
    identifying, for each input gesture and from the plurality of input regions, a corresponding initial input region containing a starting point of that input gesture received on the touchscreen;
    generating a sequence of calculated password digits by calculating for each input gesture, a corresponding password digit based on a calculated result of a mathematical operation that utilizes as operands both a corresponding base number of the corresponding initial input region of that input gesture and the value corresponding to that input gesture, wherein the calculated result for at least one of the input gestures is a negative number and the corresponding password digit for that input gesture is an absolute value of that calculated result;
    comparing the sequence of calculated password digits to a password stored in the electronic device; and
    unlocking, in response to the comparing and based on a match between the sequence of calculated password digits and the password stored in the electronic device, the electronic device.

2. The computer implemented method of claim 1, the method further comprising setting, in response to a user input, the base number corresponding to each input region of the plurality of input regions.

3. The computer implemented method of claim 1, wherein the mathematical operation includes at least one operation of a group consisting of: addition and subtraction.

4. The computer implemented method of claim 3, the wherein the at least one operation included in the mathematical operation is determined in response to a user input.

5. The computer implemented method of claim 1, wherein one of the input gestures includes a first gesture motion in a first direction and a second gesture motion in a second direction different than the first direction.

6. An electronic device comprising:
    a touchscreen; and
    one or more processor circuits, configured to:
        display, on the touchscreen of the electronic device in a locked state, at least one line dividing the touchscreen into a plurality of input regions;
        receive, on the touchscreen of the electronic device, a plurality of input gestures, each input gesture being a representation of a corresponding value;
        identify, for each input gesture and from the plurality of input regions, a corresponding initial input region containing a starting point of that input gesture received on the touchscreen;

generate a sequence of calculated password digits by calculating for each input gesture, a corresponding password digit based on a calculated result of a mathematical operation that utilizes as operands both a corresponding base number of the corresponding initial input region of that input gesture and the value corresponding to that input gesture, wherein the calculated result for at least one of the input gestures is a negative number and the corresponding password digit for that input gesture is an absolute value of that calculated result;

compare the sequence of calculated password digits to a password stored in the electronic device; and unlock, in response to the comparing and based on a match between the sequence of calculated password digits and the password stored in the electronic device, the electronic device.

7. The electronic device of claim 6, wherein the plurality of input regions of the touchscreen are quadrants.

8. The electronic device of claim 6, wherein the one or more processor circuits are further configured to change at least one characteristic of a group of characteristics consisting of the number, shape, color, width, orientation, position and spacing of the at least one line displayed on the touchscreen.

9. The electronic device of claim 8, wherein the one or more processor circuits are further configured to change at least one characteristic of the group of characteristics at a regular time interval.

10. The electronic device of claim 8, wherein the one or more processor circuits are further configured to change at least one characteristic of the group of characteristics at a random time interval.

11. A computer program product comprising:

at least one computer readable storage medium having program instructions embodied therewith, wherein the at least one non-transitory computer readable storage medium, the program instructions executable by at least one computer processor circuit to cause the at least one computer processor circuit to perform a method comprising:

displaying, on a touchscreen of an electronic device in a locked state, at least one line dividing the touchscreen into a plurality of input regions;

receiving, on the touchscreen of the electronic device, a plurality of input gestures, each input gesture being a representation of a corresponding value;

identifying, for each input gesture and from the plurality of input regions, a corresponding initial input region containing a starting point of that input gesture received on the touchscreen;

generating a sequence of calculated password digits by calculating for each input gesture, a corresponding password digit based on a calculated result of a mathematical operation that utilizes as operands both a corresponding base number of the corresponding initial input region of that input gesture and the value corresponding to that input gesture, wherein the calculated result for at least one of the input gestures is a negative number and the corresponding password digit for that input gesture is an absolute value of that calculated result;

comparing the sequence of calculated password digits to a password stored in the electronic device; and unlocking, in response to the comparing and based on a match between the sequence of calculated password digits and the password stored in the electronic device, the electronic device.

12. The computer program product of claim 11, wherein the program instructions are executable to further cause the device to, in response to one of the input gestures passing over a center dot displayed at an intersection of at least two lines displayed on the touchscreen, convert that input gesture to a "0" password digit.

13. The computer program product of claim 11, wherein the program instructions are executable to further cause the device to, in response to a delay that is greater than a predetermined delay between a first input gesture and a second input gesture, convert the delay to a "0" password digit.

14. The computer program product of claim 11, wherein the program instructions are executable to further cause the device to display, on the touchscreen, a symbol corresponding to an entered password digit of the sequence of password digits.

15. The computer program product of claim 11, wherein a shape of the at least one line displayed on the touchscreen includes at least one member of a group consisting of straight, curved, regular and irregular.

16. The computer program product of claim 11, wherein the program instructions are executable to further cause the device to allow a user of the electronic device to modify at least one characteristic of a group of characteristics consisting of the number, shape, color, width, orientation, position and spacing of the at least one line displayed on the touchscreen.

* * * * *